United States Patent
Poelmans et al.

(10) Patent No.: US 12,528,948 B2
(45) Date of Patent: Jan. 20, 2026

(54) AMINO (METH)ACRYLATES

(71) Applicant: ALLNEX BELGIUM S.A., Drogenbos (BE)

(72) Inventors: Kevin Poelmans, Halle (BE); Steven Cappelle, Ninove (BE); Stephan Peeters, Heverlee (BE)

(73) Assignee: ALLNEX BELGIUM S.A., Drogenbos (BE)

( * ) Notice: Subject to any disclaimer, the term of this patent is extended or adjusted under 35 U.S.C. 154(b) by 1421 days.

(21) Appl. No.: 16/606,351

(22) PCT Filed: May 8, 2018

(86) PCT No.: PCT/EP2018/061788
§ 371 (c)(1),
(2) Date: Oct. 18, 2019

(87) PCT Pub. No.: WO2018/206540
PCT Pub. Date: Nov. 15, 2018

(65) Prior Publication Data
US 2023/0151222 A1    May 18, 2023

(30) Foreign Application Priority Data
May 10, 2017 (EP) .................... 17170312

(51) Int. Cl.
*C09D 4/06* (2006.01)
*C07C 229/30* (2006.01)
*C08F 222/10* (2006.01)
*C09D 11/101* (2014.01)
*C09D 11/104* (2014.01)
*C09D 135/02* (2006.01)

(52) U.S. Cl.
CPC ............. *C09D 4/06* (2013.01); *C07C 229/30* (2013.01); *C08F 222/103* (2020.02); *C09D 11/101* (2013.01); *C09D 11/104* (2013.01); *C09D 135/02* (2013.01)

(58) Field of Classification Search
CPC ...... C09D 4/06; C09D 11/101; C09D 11/104; C09D 135/02; C09D 11/10; C09D 4/00; C09D 11/037; C07C 229/30; C08F 222/103; C08F 222/106; C08F 283/10; C08F 222/10
See application file for complete search history.

(56) References Cited

U.S. PATENT DOCUMENTS

| | | | |
|---|---|---|---|
| 5,180,424 A | 1/1993 | Hutter | |
| 5,792,827 A | 8/1998 | Hintze-Brüning et al. | |
| 6,172,129 B1 | 1/2001 | Fan et al. | |
| 2017/0198097 A1 | 7/2017 | Ciceron et al. | |
| 2018/0298217 A1* | 10/2018 | Monnier | C08G 65/48 |

FOREIGN PATENT DOCUMENTS

| | | | | |
|---|---|---|---|---|
| WO | 2015/197941 | 12/2015 | | |
| WO | WO-2017060638 A1 * | 4/2017 | | B29C 64/40 |

OTHER PUBLICATIONS

International Search Report issued Jun. 8, 2018 in International Application No. PCT/EP2018/061788.
Written Opinion of the International Searching Authority issued Jun. 8, 2018 in International Application No. PCT/EP2018/061788.

\* cited by examiner

*Primary Examiner* — Jessica M Roswell
(74) *Attorney, Agent, or Firm* — Wenderoth, Lind & Ponack, L.L.P.

(57) ABSTRACT

Materials of the invention are suitable for use in coating compositions, inks, paints, varnishes, adhesives, for the making of gel coats, composites, molding compositions or 3D articles. Materials of the invention are in particular suitable as surface cure boosterin UV and UV LED applications.

18 Claims, No Drawings

AMINO (METH)ACRYLATES

The present invention relates to addition products of (1) (meth)acrylated compounds having three or more (meth) acrylic ester groups per molecule reacted with (2) certain amino compounds that are highly suited for use as UV synergist in radiation curable compositions. The invention also relates to processes for the preparation of the addition products of the invention and to their use in coatings and inks. The materials of the invention are highly suitable for use in UV LED curable coatings and inks but also for other end applications.

UV LED lamps as compared to traditional mercury arc lamps have numerous and significant advantages. One of these is that UV LEDs do not generate ozone and contain no mercury, so that they can be considered more environment-friendly. Moreover, the electrical-to-optical conversion efficiency is much better and the ability to instantly turn the unit off and on enables savings of about 50-75% on electricity. Taking this into consideration along with the long lifetime of the LED—20.000 hours compared to max 2.000 hours for a medium pressure Hg lamp—and the very low maintenance required (no shutters, reflectors, chill rolls, . . . ), it is also a cost effective alternative for today's mercury lamp based UV curing equipment. The fact that an LED lamp is very compact and doesn't generate as much heat—because there is no infrared component in the emission spectrum—allows for a safe use in a wide array of applications that were not easily feasible before, such as the application of UV coatings and inks on heat sensitive substrates. Today UV LED technology is already commercial in the graphic arts market, wood coatings, electronics, composites and others.

UV LEDs emit essentially monochromatic light in the UV-A zone. So crosslinking of a UV curable coating or ink can only be effective when there is good overlap with the absorbance of the photo initiator species (PI). Only a select set of PIs absorb efficiently in this specific wavelength zone, and they are all aiming at good through cure of the coating. Thus the problem of oxygen inhibition leading to an incomplete surface cure is more pronounced with this low energy cure.

Anti-oxygen inhibition strategies can be classified according to the role(s) they play on the reactions of photoinitiation, radical polymerization, and associated side reactions with oxygen. There exist a number of physical counter measures such as the costly gas (typically $N_2$) inerting, liquid layers, wax additives or intermediate laminating to keep the oxygen away from the wet coating. Although these methodologies are very effective, they are not easily adopted in equipment as they are quite expensive and generating a new waste stream that needs to be dealt with.

Other popular work-arounds are the use of additives in the formulation to overcome the side reactions with the oxygen present and/or to increase the PI content to favor the radical polymerization rate. An increased PI content however affects the final properties of the produced coating as well as the production cost, as these are amongst the most expensive components of a formulation.

One class of interesting additives are hydrogen donors that react with the slow propagating peroxyl radicals, generating a new fast propagating radical species. Typical hydrogen donors are amines, thiols and ethers. Another class of additives used are reducing agents that reduce the peroxyl radical to a new faster propagating radical. Typical representatives of this class are phosphines and boranes.

And then there are the strategies based on modification of the monomer formulation, which include the use of (meth) acrylates bearing aforementioned reactive functional groups, high functional (meth)acrylates, (meth)acrylated dendrimers, N-vinyl amides, and hybrid radical/cationic systems. The biggest advantage of this strategy is that these components are incorporated into the final film, meaning less migrating species and in this way tailoring of the final properties of the coating or ink. Unfortunately it also means that you need to add bigger amounts of this boosting material than generally needed for additives, as the surface cure enhancing active part is only a fraction of the molecule.

Amino (meth)acrylates have been used since long in radiation curable compositions because of a synergistic effect induced by the presence of nitrogen atoms that can act as electron donor. Amino groups are known to accelerate UV crosslinking by participating in a bimolecular priming mechanism, in the presence of photoinitiators (PI) such as benzophenones. Due to this same system of electron donation they also generate efficient hydrogen donating carbons in alpha position, which at their turn enhance surface cure reactivity upon the formation of fast propagating radical species. Moreover, they act as oxygen scavenger in radiation curable formulations.

Amino synergists that are on the market today have the disadvantage that their use in UV LED curing is limited. Existing materials proved not very suitable for use in inks, for instance because of migrating issues in food packaging or because they impede the oil-water balance of an offset ink. Other disadvantages that may exist are yellowing and reduction of the coating hardness due to a decreased double bond concentration of the formulation.

Yellowing in particular forms a problem for overprint varnishes, clear coats and pigmented coating compositions that are based on light pigments (white, light blue, . . . ). Moreover, if the efficiency in counteracting the oxygen inhibition is not high enough, the incomplete surface cure can cause printer runnablity issues and has a potential for offset contamination.

Many end applications like wood and paper coatings, graphic applications, gel nails, etc. could benefit from a higher reactivity, low migration properties and a reduced odor and yellowing.

U.S. Pat. No. 5,792,827 (BASF) relates to addition products of A) oligomers having at least two acrylic ester and/or methacrylic ester groups per molecule and B) diamines having a primary and a tertiary amino group, the ratio of primary amino groups of B) to the (meth)acrylic double bonds of A) being 0.01:1 to 0.2:1. The addition products are used in surface coating compositions for wood and paper coating. These products have the disadvantage that the amino content is too low in the formulation to reach the required overall reactivity to work with the higher linespeeds in for instance printing processes (flexography presses for example can run on average at up to 500 m/min) and low energy curing applications.

WO 2015/197941 (SARTOMER) relates to acrylic oligomers having a number-average acrylate functionality $f_o>2$, of branched structure resulting from the polyaddition reaction of at least one amine A) having a functionality $f_A$ of N—H groups of at least 2, to at least one multifunctional acrylate B) having a functionality $f_B$ of acrylate groups of at least 2 with an average functionality per mole of all of the compounds A)+B) of greater than 2 and with said oligomer comprising, in its repeat unit structure, at least one amino-acrylate group —$O_2C$—$CH_2$—$CH_2$—N= resulting from said polyaddition and with a content of nitrogen resulting from said amine A) of greater than or equal to 0.35 mEq/g and an initial ratio r=acrylate/N—H of between $r_{inf}$ and 1.1

$r_{sup}$ with $r_{inf}=0.90*(f_A-1)*(f_B-1)$ and $r_{sup}=2*f_A+2*f_B-6$ and the average number n, of said repeat units per oligomer $n_{av}=1/[(r*f_A/f_B)+1-f_A]$. Said oligomers as used in radiation curable compositions, and they can be used as UV synergists.

It is an object of the present invention to bring new amino (meth)acrylates that overcome some or all of the above drawbacks.

Provided in the invention is a radiation curable addition product that contains (meth)acrylic groups and that is prepared from:
(i) at least one (meth)acrylated compound (A) which comprises at least one (meth)acrylated compound (A-1) that contains 3 or more (meth)acrylic ester groups per molecule;
(ii) at least one amino compound (C) that contains one secondary amino group and no primary amino group;
(iii) at least one amino compound (B) which comprises at least one amino compound (B1) that contains one primary amino group and at least one tertiary amino group; and, optionally,
(iv) the at least one (meth)acrylated compound (A) further comprises at least one (meth)acrylated compound (A-II) that contains 2 (meth)acrylic ester groups per molecule;
(v) the at least one amino compound (B) further comprises at least one amino compound (B2) that is selected from (B2-1) amino compounds that contain one primary amino group and/or from (B2-2) amino compounds that contain two (exactly 2) secondary amino groups, which amino compound (B2) is different from amino compounds (B1),
wherein
the nitrogen content of the radiation curable addition product is at least 1.2 meq/g; and
the average (meth)acrylate functionality per mole of the addition product is at most 2.

Materials of the invention have the advantage that
they are stable in inks
they show good surface cure under LED conditions
they have a high curing reactivity, even when cured with LED lamps
they can be produced (in part) from renewable raw materials
they have an acceptable viscosity
they exhibit a good stain resistance
they have a high nitrogen content
they can be used on heat sensitive materials Production processes for materials of the invention have the advantage that
they are based on an Aza Michael Addition reaction
they do not require solvents
conversion degrees of 95% or more can be reached The (meth)acrylated radiation curable addition product of the invention in general terms is further also referred to as the amino(meth)acrylate of the invention.

In the present invention, compounds (A) are (meth)acrylated compounds that contain at least one (meth)acrylated compound (A-1) that contains 3 or more (meth)acrylic ester groups per molecule. The term "(meth)acrylated compound" is meant to include both acrylated compounds as well as methacrylated compounds and mixtures of both. The term "(meth)acrylic ester groups" refers to the presence of acrylic ester groups, methacrylic ester groups or a mixture of both. Optionally, compounds (A) may further contain at least one (meth)acrylated compound (A-II) that contains 2 (meth)acrylic ester groups per molecule, in particular at most (or not more than or exactly) 2 (meth)acrylic ester groups per molecule. According to one specific embodiment of the invention, compounds (A) are (meth)acrylated compounds that consist of at least one (meth)acrylated compound (A-1) that contains 3 or more (meth)acrylic ester groups per molecule only. According to one embodiment, no compounds (A-II) are used as reagents.

(Meth)acrylated compounds (A-1) are typically used in an amount of at least 50 wt %, more preferably at least 70 wt % and most preferably at least 80 wt %, relative to the total weight of the (meth)acrylated compounds (A). According to one embodiment, the amount of compounds of compounds (A-1) is from 50 to 100 wt. % relative to the total weight of the (meth)acrylated compounds (A). The (meth)acrylated compounds (A) may further, optionally, comprise from 0-50 wt % of one or more (meth)acrylated compounds (A-II) that contain 2 (meth)acrylic ester groups per molecule. Typically the amount of compounds (A-II) is at most 50 wt %, more typically at most 20 wt %, relative to the total weight of the (meth)acrylated compounds (A).

(Meth)acrylated compounds (A-1) typically are tri-, tetra-, penta- and/or hexa-(meth)acrylates and more in particular tri-, tetra-, penta- and/or hexa-acrylates. Most preferably (meth)acrylated compounds (A-1) are tri- or tetra-acrylates. (Meth)acrylated compounds (A-II) typically are di-(meth)acrylates.

Compounds (A) are typically selected from (meth)acrylic esters (A1), polyether (meth)acrylates (A2), polyester (meth)acrylates (A3), epoxy (meth)acrylates (A4) and/or (poly)urethane (meth)acrylates (A5) and preferably compounds (A) are triacrylate compounds. Such compounds are well known in the art.

(Meth)acrylic esters (A1) are esters of (meth)acrylic acid with polyols, id est with compounds that contain 2 or more hydroxyl groups. Examples of suitable (meth)acrylic esters (A1) are esters of (meth)acrylic acid with two-functional polyols for compounds (A-II) and 3 or higher-functional polyols for compounds (A-1). By "(meth)acrylic acid" is meant acrylic acid, methacrylic acid or a mixture of both. In particular acrylic acid is used in the context of the present invention. By "two, three or higher-functional polyol" is meant a compound containing 2, 3 or more hydroxyl groups. Often the polyol used is an aliphatic polyol. Cycloaliphatic polyols can be used as well.

Examples of suitable aliphatic di-functional polyols suitable for making (meth)acrylated compounds (A-II) are (i) di-hydric alcohols, such as (poly)propylene glycols (like for instance propylene glycol, dipropylene glycol and tripropylene glycol); 1,3-propanediol; (poly)ethylene glycols (like for instance diethylene glycol, triethylene glycol, tetraethylene glycol, polyethylene glycol); neopentylglycol (2,2-dimethyl-1,3-propanediol); 2-methyl-1,3-propanediol (MPD); 2-ethyl-2-butyl-1,3-propanediol; 1-ethyl-2-methyl-1,3-propanediol; 2-ethyl-2-methyl-1,3-propanediol; 1,3-butylene glycol; 1,4-butanediol; 2,3-butanediol; 2-butyl-2-ethyl-1,3 propanediol (BEPD); pentanediol; 2-methyl-2-ethyl-1,3-propane diol; 1,3-pentane diol; 2,2,4-trimethyl-1,3-pentane diol; hexyleneglycol; 1,6-hexanediol; 1,8-octane diol 1,12-dodecanediol; 3-hydroxy-2,2-dimethylpropyl 3-hydroxy-2,2-dimethyl-propanoate, hydroxylpivalyl hydroxypivalate (HPHP); the hydroxypivalate of neopentyl glycol) and/or 2,2,4-trimethyl-1,3-pentanediol (TMPD). Other suitable polyols for reaction with (meth)acrylic acid are (ia) cycloaliphatic polyols such as 1,4-cyclohexanediol, 3,5-dimethylcyclohexanol (cis/trans mixture), 1,4-cyclohexanedimethanol, tricyclodecanedimethanol, 1,3-bis(4-hydroxycyclohexyl) propane, 2,2,4,4-tetramethyl cyclobutane 1,3-diol, 1,3- and 1,4-cyclohexanediol, cyclooctanediol, norbornanediol, pinanediol, decalindiol, dioxane glycol, isosorbide and hydrogenated Bisphenol A, (ib) araliphatic polyols (such as 1,3-xylylenediol) and/or (ic) aromatic polyols such as 2,2-bis(4-hydroxyphenyl)propane Bisphenol A. Preferred herein are (ia) cycloaliphatic polyols.

Examples of suitable tri- or higher functional alcohols for making (meth)acrylated compounds (A-1) include (ii) trihydric alcohols, such as but not limited to trimethylolpropane, glycerol, lactone or lactide modified forms of these and ethoxylated and/or propoxylated forms of these; (iii) tetra-hydric alcohols, such as pentaerythritol, lactone or lactide modified forms of these and ethoxylated and/or propoxylated forms of these; (iv) hexa-hydric alcohols such as but not limited to dipentaerythritol, lactone or lactide modified forms of these and ethoxylated and/or propoxylated forms of these.

Before being esterified with acrylic acid and/or methacrylic acid, the polyols listed above can have been converted into ether alcohols of higher molecular weight by alkoxylation with, for example, ethylene oxide and/or propylene oxide by well-known methods (see, for example, Houben-Weyl, Volume XIV, 2, Makromolekulare Stoffe II [Macromolecular Substances II], (1963). Polymerization products of tetrahydrofuran or butylene oxide can also be used. Can be used for instance for that purpose: alkoxylated neopentylglycol, alkoxylated hexane diol, 2,2-bis(4-hydroxyphenyl)propane, alkoxylated trimethylolpropane, alkoxylated glycerol and/or alkoxylated pentaerythritol. This results in (meth)acrylated polyethers (A2).

Suitable compounds (A) are also "polyester (meth)acrylates" (A3). Hereby is meant polyester acrylates, polyester methacrylates and mixtures of both. The polyester (meth)acrylates are prepared by using hydroxyl-containing polyesters (polyester polyols). These can be prepared by esterification of polycarboxylic acids with polyols by well-known methods (see, for example, P. J. Flory, J. Am. Chem. Soc. 58, 1877 (1936) and J. Am. Chem. Soc. 63, 3083 (1953) or by a ring opening reaction of a polyol with lactone such as caprolactone or lactide. Suitable compounds are EBECRYL® 5849, EBECRYL® 4764, EBECRYL® 810, EBECRYL®830, etc.

In some cases, it is particularly advantageous to react an epoxy resin with (meth)acrylic acid in a stoichiometric amount, relative to the epoxy functionality. The diglycidyl ether of bisphenol A and/or epoxynovolacs and epoxycresolnovolacs are particularly suitable in this respect. Before the reaction, they may also contain a few hydroxyl groups. The reaction with acrylic acid and/or methacrylic acid leads to further hydroxyl groups. Such polyhydric acrylic esters or methacrylic esters are designated as "epoxy (meth)acrylates" (A4). Hereby is meant epoxy acrylates, epoxy methacrylates and mixtures of both. Suitable compounds include e.g. EBECRYL® 600, EBECRYL® 3708, EBECRYL® 3701 and EBECRYL® 860, EBECRYL®629, EBECRYL® 639.

The addition of hydroxyl-containing (meth)acrylic esters, such as hydroxyethyl, hydroxypropyl or hydroxybutyl (meth)acrylate, and its alkoxylated, lactone- or lactide modified versions to isocyanato-containing mono- or oligomers gives the (poly)urethane (meth)acrylates (A5). The term (poly) urethane refers to both urethanes and polyurethanes as well as to a mixture of both. Preferred are aliphatic polyurethane (meth)acrylates. Suitable compounds include EBECRYL® 8402, EBECRYL® 4858, EBECRYL® 8465 and EBECRYL® 4859, EBECRYL® 254, EBECRYL®264, EBECRYL® 294.

Compounds (A) that are used in the present invention can be monomeric, oligomeric and/or polymeric compounds. Typically compounds (A) are used that have a calculated number average molecular weight (Mn) of between 150 and 3,500, more typically between 200 and 3,500-Dalton. Typically the Mn of compounds (A) is at most 3,000, preferably at most 2,000, more preferably at most 1,000, and at most 500 Dalton.

In a preferred embodiment of the invention compounds (A) are selected from (meth)acrylic esters (A1), polyether (meth)acrylates (A2) and/or polyester (meth)acrylates (A3).

(Meth)acrylated compounds (A) as described above in the invention are reacted with
- at least one amino compound (B1) that contains one (exactly one or not more than one) primary amino group and further at least one tertiary amino group and
- at least one amino compound (C) that contains one (exactly one or not more than one) secondary amino group and no primary amino group.

Compounds (B1) typically comprise no secondary amino groups. Compounds (C) typically comprise no primary amino groups.

Optionally, further amino compounds (B2) can be used to react with an addition product (AB1C) formed.

For instance, (meth)acrylated addition products AB1C can be further reacted with at least one amino compound (B2) that is selected from (B2-1) amino compounds that contain one (exactly one or not more than one) primary amino group (like e.g. monoethanolamine) and/or from (B2-2) amino compounds that contain two (exactly 2) secondary amino groups (like e.g. piperazine), which amino compound (B2) is different from amino compounds (B1). The amino compounds (B) comprise at least one amino compound (B1) and optionally at least one amino compound (B2). According to one specific embodiment, the amino compounds (B) consist of at least one amino compound (B1) only.

Typically compounds (B2) contain no tertiary amino groups. Typically compounds (B2-1) contain no secondary amino groups and typically compounds (B2-2) contain no primary amino groups. Preferred compounds for each of those categories are given below. According to one specific embodiment, (meth)acrylated addition products AB1C are not reacted with at least one amino compound (B2).

In an embodiment of the invention, amino compounds (B) are made to react with one or more compounds (A) and subsequently reacted with one or more compounds (C). In another embodiment of the invention, amino compounds (C) are first made to react with one or more compounds (A) and subsequently reacted with one or more compounds (B). In yet another embodiment of the invention, a mixture of both amino compounds (B) and (C) is used as reagents and reacted with one or more compounds A to form the addition product ABC.

Compounds (B1) are typically used in an amount of at least 30 wt %, more preferably at least 50 wt % and most preferably at least 80 wt %, relative to the total weight of the amino compounds (B). Compounds (B1) are typically used in an amount of between 30 wt % and 100 wt % of the total amount of amino compounds (B). The amino component (B) may further, optionally, comprise from 0-70 wt % of one or more amino compounds (B2) that either contain one primary amino group (compounds B2-1) or two secondary amino groups (compounds B2-2). Typically the amount of compounds (B2) is at most 50 wt %, more typically at most 20 wt %, relative to the total weight of the amino compounds (B).

Typically an amino component (B) comprises, relative to the total weight of amino compounds (B):
from 30-100 wt % (percent by weight) of one or more amino compounds (B1) as specified (like e.g. DMAPA), and
from 0-70 wt % of one or more amino compounds selected from the group of amino compounds (B2-1) and/or (B2-2) as specified.

Amino compounds (B1) typically are polyamines. By "polyamine" is meant herein an amine that contains two or more amino groups. Preferred are diamines (B1) that contain one primary amino group and one tertiary amino group but no secondary amino group.

Compounds (B1) advantageously are selected from N,N-dialkyl-diaminoalkanes (B1-1), and/or N,N-dialkanol-diaminoalkanes (B1-2).

Suitable N,N-dialkyl-diaminoalkanes (B1-1) and N,N-dialkanol-diaminoalkanes (B1-2) are N,N-dialkyldiaminopropanes (B1-1ii) and/or N,N-dialkanoldiaminopropanes (B1-2ii), such as N,N-dimethyl-1,3-diaminopropane (DMAPA), N,N-diethyl-1,3-diaminopropane, N,N-diethanol-1,3-diaminopropane N,N-di-n-propyl-1,3-diaminopropane, 4-morpholinopropylamine, 3-(N-piperidino)propylamine and/or N,N-diphenyl-1,3-diaminopropane.

Particularly suitable is N,N-dimethyl-1,3-diaminopropane (DMAPA), which is obtainable by catalytic hydrogenation of dimethylaminopropionitrile. The preparation of this diamine is described, for example, in Houben Weyl, Vol. 11/1, 1957, p. 565, in EP-A-316,761 or in P. Lappe, H. Springer and J. Weber, Chem.-Ztg. 111 (4), pp. 117-125 (1987). Also suitable are N,N-dialkyl-1,2-diaminoethanes (B1-1ii) and/or N,N-dialkanol-diaminoethanes (B1-2ii), such as N,N-dimethylaminoethylamine, N,N-diethylaminoethylamine, N,N-diethanolaminoethylamine and/or N-beta-aminoethylmorpholine (for preparation, see, for example, Houben Weyl, Vol. 11/1, 1957, p. 563), 1-(2-aminoethyl)piperidine, 2-(4-Methyl-1-piperidinyl)ethanamine, 1-methyl-4-piperidinamine, [1-(2-Aminoethyl)-4-piperidinyl]methanol, 1-Methyl-4-piperidinamine, 1-Methyl-4-piperidinamine.

Further suited are also N,N-dialkyl-1,5-diaminopentanes (B1-1iii), which can be prepared by 1,4-addition of secondary amines to 1-cyano-1,3-butadiene to give nitriles, followed by catalytic hydrogenation (for preparation, see Houben Weyl, Vol. 11/1, 1957, p. 276). Examples of suitable N,N-dialkyl-1,5-diaminopentanes are dimethylaminopentylamine, diethylaminopentylamine and/or 4-morpholinopentylamine.

Most preferred compounds (B1) are N,N-dimethyl-1,3-diaminopropane (DMAPA), N,N-dimethyl-1,3-diaminopropane and/or N,N-diethanolamino-1,3-diaminopropane. Particularly good results are obtained by using N,N-dimethyl-1,3-diaminopropane (DMAPA) as compound (B1).

Compounds (B1) used in the present invention preferably have a weight average molecular weight (MW) of from 88 to 500 Dalton, more preferably from 100 to 300 Dalton. In the present invention, the molecular weight is typically calculated from the chemical formula of the polyamine (B1).

The amino compounds (B2) that are used in the present invention preferably have a weight average molecular weight (MW) of from 31 to 500 Dalton, more preferably from 45 to 300 Dalton. In the present invention, the molecular weight is typically calculated from the chemical formula of the amine (B2).

Compounds (B2-1) that optionally may be used typically contain no secondary amino groups and typically also no tertiary amino groups. They are typically primary amines that contain one primary amino group. Examples of amino compounds (B2-1) that contain one primary amino group are those that correspond to formula $R^1$—$NH_2$ (I) wherein $R^1$ represents an alkyl, which alkyl optionally is substituted by hydroxy, alkoxy, and/or aryl groups.

Compounds (B2-1) may e.g. be selected from one or more of the following: methylamine, ethylamine, ethanol amine, n-propylamine, iso-propylamine, n-butylamine, iso-butylamine, sec-butylamine, tert-butylamine, 3-methyl-butylamine, n-hexylamine, n-octylamine, n-dodecylamine, 2-ethylhexylamine, iso-nonylamine, cyclopentylamine, cyclohexylamine, 2-methylcyclohexylamine, benzylamine, 2-(2-aminoethoxy)ethanol, 5-aminopentanol, 3-amino-1-propanol, iso-propanolamine, 2-amino-2-methyl-1-propanol, 2-methoxyethylamine, 2-ethoxyethylamine, 3-methoxypropylamine, 1-methoxyisopropylamine, 3-ethoxypropylamine, 3-isopropoxypropylamine, 3-(2-methoxyethoxy)propylamine, 3-(2-ethylhexyloxy)propylamine, furfurylamine, and mixtures thereof.

Preferred are alkylamines (B2-1) where the alkyl group comprises from 1 to 30 carbon atoms, in particular from 1 to 18 carbon atoms, more in particular from 1 to 14 carbon atoms, which alkyl group optionally can be substituted by one or more hydroxy groups. The term "alkyl", as used herein, is defined as including saturated monovalent hydrocarbon radicals having straight, branched or cyclic moieties or combinations thereof.

Especially preferred are ethylamine, n-propylamine, n-butylamine, n-hexylamine, 2-ethylhexylamine, cyclohexylamine, n-octylamine, n-dodecylamine, 2-(2-aminoethoxy)ethanol, 5-aminopentanol, ethanolamine, 3-amino-1-propanol, iso-propanolamine, 2-amino-2-methyl-1-propanol, and mixtures thereof. Particularly preferred are ethanolamine, iso-propanolamine, 2-amino-2-methyl-1-propanol, and mixtures thereof. Most preferred is ethanolamine.

Suitable compounds (B2-2) that optionally may be used are e.g. those that correspond to formula $R^2HN$—$R^4$—$NHR^3$ (II) wherein $R^2$ and $R^3$ represent, each independently, an alkyl, optionally substituted by hydroxy, alkoxy, tertiary amine and/or aryl, with the proviso that $R^2$ and $R^3$ can be linked in order to form a ring, and $R^4$ is chosen from the group of alkylene and aralkylene chains, containing up to 50 carbon atoms (typically up to 20 carbon atoms) and which may contain from 1 to 20 ether bridges (typically from 1 to 8 ether bridges) and/or from 1 to 3 tertiary amine bridges. The term "alkylene", as used herein is meant to designate bivalent straight, branched or cyclic hydrocarbon radicals. The term "aralkylene", as used herein is meant to designate an alkylene wherein one or more hydrogen groups are replaced by aryl groups.

Preferably, $R^4$ is chosen from the group of bivalent radicals of ethylene, 1,2-propylene, trimethylene, hexamethylene, 2,2-dimethylpropylene, 1-methyltrimethylene, 1,2,3-trimethyltetramethylene, 2-methyl-pentamethylene, 2,2,4-(or 2,4,4-)trimethylhexamethylene, metaxylylene, 3,5,5-trimethylcyclohexyl-1-ene-3-methylene, bis(cyclohexyl-4-ene)methane, bis(4-methylcyclohexyl-3-ene)methane, cyclohexyl-1,3-ene, cyclohexyl-1,4-ene, 1,4-bis(propoxyl-3-ene)butane, 3,6-dioxaoctylene, 3,8-dioxadodecylene, 4,7,10-trioxatridecylene, poly(oxytetramethylene), poly(oxypropylene) with 2 to 15 1,2-propylene oxide units, poly(oxypropylene-co-oxyethylene) with 2 to 15 propylene oxide and 2 to 15 ethylene oxide units, 2,2-dimethylpropylene.

Examples of amino compounds (B2-2) include N,N-Dimethylethylenediamine, 1,4,7-trimethyldiethylenetriamine, piperazine, 2,3,5,6-tetramethylpiperazine, N,N-bis(trimethylene)methylamine, N,N'-Di-tert-butylethylenediamine.

Most preferred amino compounds (B2) are ethanolamine, isopropanolamine, 2-amino-2-methyl-1-propanol, and mixtures thereof.

When used, then compounds (B2) are typically used in an amount of at most 70 wt %, more preferably at most 50 wt % and most preferably at most 20 wt %, relative to the total weight of the amino compounds (B).

In an embodiment of the invention, an amino component (B) is used that is comprised of (or consists of) from 30-100 wt % of compounds (B1) as described and, optionally, from 0-70 wt % of compounds (B2) as described, wherein the weight percentages are relative to the total weight of compounds (B). Weight percentages of amino compounds (B1) and of amino compounds (B2) advantageously add up to 100%, disregarding small amounts of other amino compounds that may be present as impurity. Most typically the amino component (B) consists of amino compounds (B1) and amino compounds (B2) only. According to one specific embodiment of the invention, the amino component (B) consists of amino compounds (B1) only. According to one embodiment no compounds (B2) are used as reagents.

Suitable compounds (C) can be mono- or polyamine compounds comprising one (exactly one or not more than one) secondary amino group and optionally one or more tertiary amino groups.

Compounds (C) typically contain no primary amino groups.

Examples of suitable amino compounds (C) are those that correspond to formula:

R'—NH—R wherein R' is an alkyl, optionally substituted by hydroxy, alkoxy, tertiary amine and/or aryl, and, R is an alkyl, optionally substituted by hydroxy, alkoxy, tertiary amine and/or aryl, with the proviso that R' and R may be linked together in order to form a ring.

Compounds (C) may e.g. be selected from one or more of the following: dimethylamine, diethylamine, diethanol amine, di n-propylamine, di iso-propylamine, di n-butylamine, diiso-butylamine, disec-butylamine, ditert-butylamine, di 3-methylbutylamine, di n-hexylamine, di n-octylamine, di n-dodecylamine, di 2-ethylhexylamine, diiso-nonylamine, di cyclopentylamine, dicyclohexylamine, di 2-methylcyclohexylamine, dibenzylamine, di 2-(2-aminoethoxy)ethanol, di 5-aminopentanol, di 3-amino-1-propanol, iso-propanolamine, di 2-amino-2-methyl-1-propanol, di 2-methoxyethylamine, di 2-ethoxyethylamine, di 3-methoxypropylamine, di 1-methoxyisopropylamine, di 3-ethoxypropylamine, di 3-isopropoxypropylamine, di 3-(2-methoxyethoxy)propylamine, di 3-(2-ethylhexyloxy)propylamine, di furfurylamine, piperidine, 4-methyl piperidine, 4-ethyl piperidine, 3-methyl piperidine, 2-methyl piperidine, 4-isopropyl piperidine, 2,2,6,6 tetramethyl piperidine, 4-ethyl-4-methyl piperidine, morpholine and mixtures thereof. According to one specific embodiment, compound (C) is Dipropylamine.

Other suitable examples are amino compounds (C) comprising one primary and one or more tertiary amino groups selected from the group of N,N-dialkyl-diaminoalkanes, N,N-dialkanol-diaminoalkanes. Suitable examples include N,N-dialkyl-diaminoalkanes and N,N-dialkanol-diaminoalkanes are N,N,N'-trimethylethylenediamine, N,N-dimethyl-N-ethylethylenediamine, N,N,N'-Trimethyl-1,3-propanediamine, N,N,N,N-tetraethyldiethylentriamine, N,N,N-triethylethylenediamine, 1-[2-(4-piperidinyl)ethyl] piperidine, 1-methylpiperazine, 4-(dimethylamino)-piperidine, 3,3-Iminobis(N,N-dimethylpropylamine)

Preferred are dialkylamines where the alkyl group comprises from 1 to 30 carbon atoms, in particular from 1 to 18 carbon atoms, more in particular from 1 to 14 carbon atoms, which alkyl group optionally can be substituted by one or more hydroxy groups. The term "alkyl", as used herein, is defined as including saturated monovalent hydrocarbon radicals having straight, branched or cyclic moieties or combinations thereof.

Especially preferred are diethylamine, di n-propylamine, di n-butylamine, di n-hexylamine, di 2-ethylhexylamine, di cyclohexylamine, di n-octylamine, di n-dodecylamine, di 2-(2-aminoethoxy)ethanol, di 5-aminopentanol, diethanolamine, di iso-propanolamine, piperidine and mixtures thereof. Particularly preferred are diethylamine, diethanolamine, di n-propylamine, di iso-propanolamine, piperidine, morpholine, and mixtures thereof (of any of these). Most preferred are diethylamine, di n-propylamine and/or diethanolamine.

The amino compounds (C) used in the present invention preferably have a calculated weight average molecular weight (MW) of from 45 to 500 Dalton, more preferably from 45 to 300 Dalton. In the present invention, the molecular weight is typically calculated from the chemical formula of the amine (C).

In still another embodiment of the invention an addition product (ABC) is formed by reaction of (meth)acrylated compound (A) with amino compounds (B) as described and with amino compounds (C) as described. In one embodiment, both compounds (B1) and (B2) are used. This leads to a compound AB1B2C. In another embodiment, one or more compounds (B1) are used but no compound (B2). This leads to a compound AB1C.

The addition product (ABC) is typically having an average (meth)acrylate functionality of at most 2 (but >0). In this case the molar ratio of amino compounds (B1+B2) relative to (meth)acrylated compounds (A) typically is between 0.1 and 0.8, more preferably between 0.15 and 0.7, most preferably between 0.2 and 0.5.

Amino (meth)acrylates of the invention (addition product ABC) typically are oligomeric or polymeric in nature. The calculated molecular weight of the addition products of the invention typically is at least 400, more preferable at least 1,000 Dalton. The molecular weight is at most 10,000 Dalton, more preferably at most 7,000 Dalton, most preferable at most 5,000 Dalton.

Amino (meth)acrylates of the invention typically have a viscosity at 25° C. of from 50 to 100.000 mPa·s, more preferably of from 75 to 50.000 mPa·s, even more preferably of from 100 to 20.000 mPa·s, most preferably between 150 to 10000 mPa·s. The viscosity typically is measured using a cone and plate type rheometer MCR100 (Paar-Physica) following ISO 3219. The measurement geometry for measuring the addition products of the invention was of a diameter of 50 mm and an angle of 1° for the cone. The measurement was a flow curve in controlled shear rate ranging from D=0 s-1 (zero viscosity), D=2.5 s-1 to D=2500 s-1 at 25° C.

The addition product (ABC) obtained and used in the present invention preferably have a content of double bonds (calculated as meq C=C/g) of 0.01 to 4.2, more preferably of 0.1 to 4, most preferably 1 to 3 meq/g.

The nitrogen content of addition product (ABC) of the invention is preferably between 1.2 and 6.5 meq N/g, more preferably 2 to 6 meq N/g, most preferably 3 to 5.5 meq N/g. The "meq N/g" is herein expressed on the addition product of the invention.

Typically the weight percentages of compounds (A), (B) and (C) used to make the amino(meth)acrylates of the invention sum up to at least 95 wt %, preferably to at least 98 wt % and most typically they sum up to 100 wt %. Most typically no compounds other than (A), (B1), (B2), and (C) are used to prepare addition product (ABC) according to the invention. Typically these compounds (A), (B1), (B2), and (C) all differ from each other.

The addition product (ABC) of the invention advantageously is liquid at room temperature (which in general is a temperature between 20° C. and 25° C.).

The present invention also provides for processes of making amino (meth)acrylates according to the invention, also referred to as the (meth)acrylated addition product (ABC) of the invention.

The addition product (ABC) of the invention can be prepared via an Aza Michael addition reaction. The reaction between the (meth)acrylated compounds (A) and the amino compounds (B) and/or (C) as defined can take place without any catalyst or solvent. The reaction can be carried out at temperature between −30° C. to +150° C., the preferred temperature is from 25° C. to 100° C. Although solvent is not required it may be used to facilitate the heat and mass transfer.

The reaction is preferably carried out in an inert gas atmosphere, for example, under nitrogen or argon, to prevent or minimize unwanted side reactions. However, this is not necessary for a successful reaction.

In carrying out the reaction the (meth)acrylated compounds (A) can be added to the amino compounds (B) and (C), or the amino compounds (B) and (C) can be added to the (meth)acrylated compounds (A); the latter procedure being preferred.

In yet another embodiment of the invention, the (meth)acrylated compounds (A) can be added to the amino compounds (B), or the amino compounds (B) can be added to the (meth)acrylated compounds (A) to form the addition product (AB). In a further step, compound (C) can then be added to the addition product (AB) or the addition product (AB) can be added to the compound (C) to form an addition product (ABC).

In still another embodiment of the invention, the (meth)acrylated compounds (A) can be added to the amino compounds (C), or the amino compounds (C) can be added to the (meth)acrylated compounds (A) to form the addition product (AC). In a further step, compound (B) can then be added to the addition product (AC) or the addition product (AC) can be added to the compound (B) to form an addition product (ABC).

Depending on the quantities and nature of the reagents, a single addition product or a mixture of different addition products can be obtained, optionally in the presence of some remaining (meth)acrylated compounds (A).

In general, the reaction is carried out without solvents, but it is also possible to use solvents, especially in order to meter in solid amino compounds (B) and (C) as a solution. After Aza Michael addition has taken place, the solvent is then removed.

To ensure that no undesirable polymerization takes place during the addition reaction, polymerization inhibitors are usually added to the reaction mixture. Suitable polymerization inhibitors include known products, such as substituted phenols, such as 2,6-di-tert.-butyl-p-cresol, hydroquinones, such as methylhydroquinones, and thio ethers, such as thiodiglycol or phenothiazine.

Although it is possible to separate the unreacted (meth) acrylated compounds (A) from the amino(meth)acrylate (ABC), generally the (meth)acrylated compounds (A) that may remain are not separated from the amino(meth)acrylates (ABC) before further use in radiation curable compositions.

Other polymer stabilizers may also be added during or after the reaction. Typically aromatic or aliphatic phosphites can be used. The present invention also relates to the use of such amino(meth)acrylates, especially in the radiation curable compositions such as described here below.

These addition products (ABC) of the invention have been found to be very effective in UV and in EB (electron beam) curing and can be used alone or along with other (meth)acrylated compounds (D). By "other" is meant a (meth)acrylate different from the addition product (ABC) of the invention.

The amino(meth)acrylates according to the invention are readily cured by ultraviolet light radiation or electron beam radiation.

They are in particular very effective in UV LED curing or other low energy curing applications. They are also suitable in applications requiring high cure speed like the graphic arts industry.

The amino (meth)acrylates (ABC) according to the invention are compatible with other radiation curable compounds and with ingredients standardly used in the art of radiation curing. Another aspect of the invention relates to radiation curable compositions comprising at least one radiation curable addition product (ABC) according to the invention.

Amino (meth)acrylates (ABC) according to the invention and/or radiation curable compositions comprising same, are highly suited for use as surface cure booster in UV and more in particular UV LED applications. They advantageously act as amino synergists.

Materials of the invention can be used for the making of coatings, paints, inks, varnishes (including overprint varnishes) and adhesives but also for the making of gel coats, composites, molding compositions or 3D articles. Materials of the invention are further suitable for use in 3D printing.

Radiation curable compositions used in the present invention usually contain at least 5% by weight of one or more amino(meth)acrylates as described above (any of the above). Preferably the composition comprises at least 10% by weight of one or more amino(meth)acrylates according to the invention. The amount of amino(meth)acrylates (ABC) according to the invention usually does not exceed 99% by weight (wt %).

The radiation curable composition usually contains besides the one or more amino(meth)acrylates (ABC), at least one radiation curable polymer precursor (D) other than the amino(meth)acrylate (ABC). The term polymer precursor is used to designate a monomer or oligomer or mixtures thereof which have suitable polymerizable functionality, preferably comprising at the chains ends or laterally along the chain, one or more acrylic, methacrylic or vinyl groups. This radiation curable polymer precursor is generally a monomer or oligomer comprising one or more acrylic, methacrylic or vinyl groups. Preferably it is a (meth)acrylated compound (D) that is different from the amino(meth) acrylates (ABC) according to the invention. The compound (D) can be selected from compounds (A) given above but can also be different therefrom. The radiation curable composition may optionally comprise 1% of one or more (meth) acrylated compounds (D).

Preferred oligomers (D1) include (meth)acrylated acrylic oligomers, aromatic acid (meth)acrylates, (meth)acrylated polybutadienes, (meth)acrylated polyesters, urethane (meth)acrylates, epoxy (meth)acrylates and hyperbranched (meth)acrylates such as hyperbranched polyester polyol (meth)acrylates.

Preferred oligomers (D1) are those having a calculated molecular weight of at least 1,000 and not more than 6,000 Dalton.

When used, the quantity of oligomer (D1) in the radiation curable composition is generally at least 1 wt %, more preferably at least 5 wt %, most preferably at least 10 wt %. The quantity of oligomer does usually not exceed 99 wt %, more preferably it does not exceed 95 wt % by weight, most preferably it does not exceed 90 wt %, relative to the total weight.

The radiation curable composition can also contain lower molecular weight (meth)acrylated monomers (D2) such as (meth)acrylic acid, beta-carboxyethyl (meth)acrylate, butyl (meth)acrylate, methyl(meth)acrylate, isobutyl (meth)acrylate, 2-ethylhexyl(meth)acrylate, cyclohexyl (meth)acrylate, n-hexyl (meth)acrylate, isobornyl (meth)acrylate, isooctyl (meth)acrylate, n-lauryl (meth)acrylate, octyl/decyl (meth)acrylate, 2-hydroxyethyl(meth)acrylate, phenoxyethyl (meth)acrylate, nonylphenolethoxylate mono(meth)acrylate, 2-(2-ethoxyethoxy)ethyl(meth)acrylate, 2-butoxyethyl (meth)acrylate, Cardura (meth)acrylate (the (meth)acrylate of the glycidyl ester of neodecanoic acid also known as Cardura® E-10P), phenylglycidylether(meth)acrylate and the ethoxylated or/and propoxylated derivatives thereof, the (meth)acrylates obtained from the esterification with (meth)acrylic acid of aliphatic glycidyl ethers, especially those wherein the alkyl chain comprises from 6 to 24 carbon atoms, more preferably from 8 to 18 carbon atoms, and/or of glycidyl esters of saturated and unsaturated carboxylic acids, especially the glycidyl esters of long chain alkyl carboxylic acids wherein the alkyl chain, 1,6-hexanediol di(meth)acrylate, tricyclodecane dimethanol di(meth)acrylate, isosorbide di(meth)acrylate, di or tri propylene glycol di(meth)acrylate, ethoxylated and/or propoxylated neopentylglycoldi(meth)acrylate, isosorbide di(meth)acrylate, and ethoxylated and/or propoxylated derivatives thereof, bisphenol A di(meth)acrylate and the ethoxylated and/or propoxylated derivatives thereof, trimethylolpropanetri(meth)acrylate and the ethoxylated and/or propoxylated derivatives thereof, di-trimethylolpropanetri(meth)acrylate, glyceroltri(meth)acrylate and the ethoxylated and/or propoxylated derivatives thereof, pentaerythritoltriacrylate (PETIA) and the ethoxylated and/or propoxylated derivatives thereof, dipentaerythritol penta or hexaacrylate and the ethoxylate and/or propoxylated derivatives thereof.

When used, the quantity of monomers (D2) in the radiation curable composition is generally at least 1%, preferably at least 5% by weight, more preferably at least 10% by weight. The quantity of oligomer does usually not exceed 99% by weight, preferably it does not exceed 95% by weight, most preferably it does not exceed 80% by weight relative to the total weight.

In a specific embodiment of the invention, the compound (D) is an amino (meth)acrylate different from the amino (meth)acrylates (ABC) of the invention. Examples of such amino (meth)acrylates are EBECRYL® 80, 81, 83, 85, LEO 10551, LEO 10552 or LEO 10553 available from Allnex. Preferably however, no such amino (meth)acrylates (D) are used if low yellowing is desired.

Radiation curable compositions used in the present invention generally comprise at least one photoinitiator that is a compound that can generate radicals by absorption of light, typically UV light. Typical photoinitiators are described in "The Chemistry of Free Radical Polymerization", edited by Graeme Moad and David H. Solomon; Pergamon (1995), pages 84 to 89. The photoinitiators usable in the compositions used in the invention can be selected from hydroxyketones, aminoketones, benzildimethyl-ketals, acyl phoshines, benzophenone derivatives, thioxanthones and mixtures thereof. Polymeric or multifunctional photoinitiators known to be less easily extracted than monomeric products are preferred. Typically, the amount of photoinitiator in the composition is comprised between 0 and 15% by weight, more preferably between 1 to 10% by weight, most preferably between 1 to 5% by weight Alternatively, radiation curable compositions of the invention can be cured without photoinitiator, typically by electron beam though UV curing without photoinitiator is also possible for instance when Excimer lamps are used.

The radiation curable composition can also contain additives commonly used in varnishes, paints, coatings, adhesives and inks, such as substrate wetting agents, anti-foam agents, dispersing agents, flow modification agents, slip agents, plasticizing diluents, fire retardant agents, UV-protection agents, adhesion promoters, amine synergists, reinforcing agents and stabilizers. The total amount of commonly used additives usually does not exceed 10% by weight. Preferably, the composition comprises from 0.01 to 5% by weight of commonly used additives as described here above.

The radiation curable composition can also contain one or more pigment, dye or colorant. The colorants, dyes and pigments usable in the compositions of the invention are all pigments known in the art. A list of such pigments can be found in the Color Index. More particularly, those pigments may be cited such as Process Yellow 13 (Diarylide Yellow—Irgalite BAW of Ciba, Permanent GR of Clariant), Process Magenta Pigment 57 (Bona Calcium—Ilobona 4BY of Sun, Irgalite SMA of IGM), Process Blue 15.3 (Copper Phthalocyanine—Irgalite GLO of IGM, Hostaperm Blue B2G of Clariant), Process Black 7 (Oxidised Carbon Black—Special Black 250; Special Black 350 of Degussa), etc. The colorants and/or pigments are preferably used at 0-50% by weight of the total weight of the radiation curable composition, more preferably at 0-40% by weight.

The radiation curable composition may also comprise from 0 to 20% by weight of fillers or non-reactive diluents or solvents.

The radiation curable compositions of the invention can be produced by mixing the selected compounds thereof by conventional known methods. The blend can be heated, if desired, to facilitate mixing.

Radiation curable compositions as described here above are used for making varnishes (including overprint varnishes), coatings, paints, adhesives and inks. By inks is meant to understand liquid inks as well as paste inks. In particular flexography inks, serigraphy inks, inkjet inks, offset inks and/or xerography inks can be made using the amino (meth)acrylates according to the invention. Inks typically contain pigments, dyes and/or colorants in addition to other possible additives like fillers, wetting and flow modifiers, leveling additives, viscosity modifiers and dispersing additives. They can further be used in the making of composites and gel coats; molding compositions or for the making of 3D articles.

The amino (meth)acrylates (ABC) according to the invention are also very suitable for the making of coating compositions and for the coating of various types of substrates.

Another aspect of the invention hence relates to a method of coating an article or substrate.

The method according to the invention generally comprises the steps of:
(a) providing a radiation curable composition as described here above,
(b) applying said composition onto a surface, and
(c) irradiating the surface with actinic radiation.

In the method according to the invention, advantageously an UV LED lamp is used as irradiation source and more in particular one that is emitting at 365, 385, 395 or 405 nm.

In the method according to the invention, the compositions can be applied to the surface by any coating technique, including the spray, curtain, dip, pad and roll-coating techniques, as well as any printing technique such as lithography, serigraphy, flexography, gravure and inkjet printing.

The substrate to be coated or inked can be any substrate, such as wood, metal, paper, plastic, fabric, fiber, ceramic, concrete, plaster, glass, etc. Good results have been obtained with flexible substrates, especially with paper and plastic substrates. Materials of the invention permit the application of inks, coatings, paints and varnishes (including overprint varnishes) of the invention on heat sensitive materials like e.g. MDF, some metal alloys etc.

The coating can be a clear coating or a pigmented coating. The pigmented coating can be one that is based on light pigments (such as white, light blue, . . . ).

The irradiation of the surface can be done by high energy electrons (EB) or UV radiation. For the UV irradiation multiple types of lamps can be used, going from the classical medium pressure Hg, to metal halide UV lamps to UV light emitting diodes, not excluding other lamps/LEDs emitting UV light.

Various types of actinic radiation can be used such as ultraviolet (UV) radiation, gamma radiation, and electron beam. A preferred means of radiation curing is ultraviolet radiation. Any ultraviolet light source, as long as part of the emitted light can be absorbed by the photo-initiator (system), may be employed as a radiation source, such as, a high or low-pressure mercury lamp, a cold cathode tube, a black light, UV-A lamps, Xenon lamp, an ultraviolet LED, an ultraviolet laser, and a flash light or even visible light sources. Currently on the market you find 365, 385, 395 and 405 nm UV LEDs.

The coatings, varnishes (including overprint varnishes), paints, adhesives and inks obtained by the method according to the invention can be cured at high line speeds or with low energy radiation, which makes them very suitable for packaging applications, such as food packaging, but also other types of packaging used for luxury products such as cosmetics and pharmaceuticals. Also provided in the present invention are food packaging materials coated or inked with a radiation curable composition according to the invention (any of the ones described).

The present invention therefore also relates to the coatings, varnishes (including overprint varnishes), paints, adhesives and inks obtained with the method of the invention and/or prepared from the amino(meth)acrylates (ABC) according to the invention.

Typically, UV LED technology is used in the graphic arts market, in wood coatings, electronics, the making of composites, gel coats, molding compositions, 3D printing, etc.

The present invention is illustrated by the following, non-limiting examples.

EXAMPLES

The following generic processes were used herein to prepare the adducts of amines and di(meth)acrylates specified herein:

Example 1

A reaction vessel was charged with 1144 g EBECRYL® 40 (a tetrafunctional polyether acrylate commercially available from Allnex) (2 moles) as well as 250 ppm of stabilizer relative to total amount of (meth)acrylate compounds A (EBECRYL® 40), amino compounds B (3-(dimethylamino)-1-propylamine (DMAPA)) and amino compounds C (Dipropylamine (DPA)). The reaction mixture was heated and the temperature was set at 60° C. 425 g (4.2 moles) of dipropylamine was added dropwise so that the temperature was not exceeding 75° C. Once the addition was completed, the mixture was further reacted for 2 hrs at 60° C. After this 76.6 g of dimethylamine propylamine (0.75 mole) was added dropwise so that the temperature did not exceed 75° C. Once the addition was completed, the reaction temperature was increased to 80° C. and left to maturate at this temperature until the free amino concentration was lower than 0.02%.

Example 2

A reaction vessel was charged with 1144 g EBECRYL® 40 (2 moles) as well as 250 ppm of stabilizer relative to total amount of (meth)acrylate compounds A (EBECRYL® 40), amino compounds B (3-(dimethylamino)-1-propylamine) and amino compounds C (Dipropylamine). The reaction mixture was heated and the temperature was set at 60° C. 425 g (4.2 moles) of dipropylamine was added dropwise so that the temperature was not exceeding 75° C. Once the addition was completed, the mixture was further reacted for 2 hrs at 60° C. After this 153.3 g of 3-(dimethylamino)-1-propylamine (1.5 moles) was added dropwise so that the temperature did not exceed 75° C. Once the addition was completed, the reaction temperature was increased to 80° C. and left to maturate at this temperature until the free amino concentration was lower than 0.02%.

Example 3

A reaction vessel was charged with 944 g TMP(OE)$_4$TA (ethoxylated trimethylolpropane triacrylate) (2 moles) as well as 250 ppm of stabilizer relative to total amount of (meth)acrylate compounds A (TMP(OE)$_3$TA), amino compounds B (3-(dimethylamino)-1-propylamine) and amino compounds C (Dipropylamine). The reaction mixture was heated and the temperature was set at 60° C. 212.5 g (2.1 moles) of dipropylamine was added dropwise so that the temperature was not exceeding 75° C. Once the addition was completed, the mixture was further reacted for 2 hrs at 60° C. After this 76.6 g of 3-(dimethylamino)-1-propylamine (0.75 mole) was added dropwise so that the temperature did not exceed 75° C. Once the addition was completed, the reaction temperature was increased to 80° C. and left to maturate at this temperature until the free amino concentration was lower than 0.02%.

Example 4

A reaction vessel was charged with 592 g TMPTA (trimethylolpropane triacrylate) (2 moles) as well as 250 ppm of stabilizer relative to total amount of (meth)acrylate compounds A (TMPTA), amino compounds B (3-(dimethylamino)-1-propylamine) and amino compounds C (Dipropylamine). The reaction mixture was heated and the temperature was set at 60° C. 212.5 g (2.1 moles) of dipropylamine was added dropwise so that the temperature was not exceeding 75° C. Once the addition was completed, the mixture was further reacted for 2 hrs at 60° C. After this 76.6 g of 3-(dimethylamino)-1-propylamine (0.75 mole) was added dropwise so that the temperature did not exceed 75° C. Once the addition was completed, the reaction temperature was increased to 80° C. and left to maturate at this temperature until the free amino concentration was lower than 0.02%.

Example 5

A reaction vessel was charged with 296 g TMPTA (1 mole) and 242 g DPGDA (dipropylene glycol diacrylate) (1 mole) as well as 250 ppm of stabilizer relative to total amount of (meth)acrylate compounds A (TMPTA and DPGDA), amino compounds B (3-(dimethylamino)-1-propylamine) and amino compounds C (Dipropylamine). The reaction mixture was heated and the temperature was set at 60° C. 101.2 g (1 mole) of dipropylamine was added dropwise so that the temperature was not exceeding 75° C. Once the addition was completed, the mixture was further reacted for 2 hrs at 60° C. After this 76.6 g of 3-(dimethylamino)-1-propylamine (0.75 mole) was added dropwise so that the temperature did not exceed 75° C. Once the addition was completed, the reaction temperature was increased to 80° C. and left to maturate at this temperature until the free amino concentration was lower than 0.02%.

Comparative Example 1 (EBECRYL® 40 and Reaction with DMAPA but without DPA)

A reaction vessel was charged with 1144 g EBECRYL® 40 (2 moles) as well as 250 ppm of stabilizer relative to total amount of (meth)acrylate compounds A (EBECRYL® 40) and amino compounds B (3-(dimethylamino)-1-propylamine). The reaction mixture was heated and the temperature was set at 60° C. 76.6 g of 3-(dimethylamino)-1-propylamine (0.75 mole) was added dropwise so that the temperature did not exceed 75° C. Once the addition was completed, the reaction temperature was increased to 80° C. and left to maturate at this temperature until the free amino concentration was lower than 0.02%.

Comparative Example 2 (EBECRYL® 40 and Reaction with DMAPA but without DPA)

A reaction vessel was charged with 1144 g EBECRYL® 40 (2 moles) as well as 250 ppm of stabilizer relative to total amount of (meth)acrylate compounds A (EBECRYL® 40) and amino compounds B (3-(dimethylamino)-1-propylamine). The reaction mixture was heated and the temperature was set at 60° C. 153.3 g of 3-(dimethylamino)-1-propylamine (1.5 moles) was added dropwise so that the temperature did not exceed 75° C. Once the addition was completed, the reaction temperature was increased to 80° C. and left to maturate at this temperature. After 3 hours reaction the reaction mixture gelled.

Comparative Example 3 (EBECRYL® 40 and Reaction with DPA but without DMAPA)

A reaction vessel was charged with 1144 g EBECRYL® 40 (2 moles) as well as 250 ppm of stabilizer relative to total amount of (meth)acrylate compounds A (EBECRYL® 40) and amino compounds C (Dipropylamine). The reaction mixture was heated and the temperature was set at 60° C. 425 g (4 moles) of dipropylamine was added dropwise so that the temperature was not exceeding 75° C. Once the addition was completed, the mixture was left to further maturate at 60° C. until the free amino concentration was lower than 0.02%.

Comparative Example 4 (Only a 2 Functional Acrylate DPGDA)

A reaction vessel was charged with 484 g DPGDA (2 moles) as well as 250 ppm of stabilizer relative to total amount of (meth)acrylate compounds A (DPGDA) and amino compounds B (3-(dimethylamino)-1-propylamine). The reaction mixture was heated and the temperature was set at 60° C. 76.6 g of 3-(dimethylamino)-1-propylamine (0.75 mole) was added dropwise so that the temperature did not exceed 75° C. Once the addition was completed, the reaction temperature was increased to 80° C. and left to maturate at this temperature until the free amino concentration was lower than 0.02%

TABLE 1

Characterization of the amino(meth)acrylates prepared according to the invention

| | Ex 1 | Ex 2 | Ex 3 | Ex 4 | Ex 5 |
|---|---|---|---|---|---|
| EBECRYL ® 40 | 1144* | 1144 | | | |
| TMP(OE)$_4$TA | | | 944 | | |
| TMPTA | | | | 592 | 296 |
| DPGDA | | | | | 242 |
| dimethylamino propyl amine | 76.6 | 153.3 | 76.6 | 76.6 | 76.6 |
| Dipropylamine | 425 | 425 | 212.5 | 212.5 | 106.25 |
| h$^{25°\ C.}$, mPa · s | 700 | 854 | 504 | 1344 | 529 |
| nitrogen content, meq/g | 3.5 | 4.2 | 2.9 | 4.2 | 3.5 |
| (meth)acrylate content, meq/g | 1.4 | 0.5 | 2 | 2.7 | 3.4 |

*Amounts are in grams, unless specified otherwise.

TABLE 2

Characterization of comparative examples

| | Comp Ex 1 | Comp Ex 2 | Comp Ex 3 | Comp Ex 4 |
|---|---|---|---|---|
| EBECRYL ® 40 | 1144 | 1144 | 1144 | |
| TMP(OE)$_4$TA | | | | |
| TMPTA | | | | |
| DPGDA | | | | 484 |
| 3-(dimethylamino)-1-propylamine | 76.6 | 153.3 | | 76.6 |
| Dipropylamine | | | 425 | |
| h$^{25°\ C.}$, mPa · s | 564 | gelled | 202 | 165 |
| nitrogen content, meq/g | 1.2 | — | 2.7 | 2.7 |
| (meth)acrylate content, meq/g | 5.3 | — | 2.4 | 4.5 |

Examples 1,3,4 include reactions of a 4-functional (EBECRYL® 40) and 3-functional (TMP (OE) 4TA and TMPTA) acrylate compound with dipropylamine and 0.75 mole of 3-(dimethylamino)-1-propylamine. Example 2 is similar to example 1, except that a higher amount of 3-(dimethylamino)-1-propylamine is used (1.5 moles). In example 5 a mixture of a 2- and 3 functional acrylate compound is used. All amino acrylates of examples 1-5 have an average acrylate functionality below 2.

Comparative examples 1 and 3 are similar to example 1, but without respectively dipropylamine and dimethylaminopropylamine. Comparative example 2 is similar to example 2 but without dipropylamine. Note that during the synthesis this product gelled. Comparative example 4 is prepared with only a 2 functional acrylate monomer (DPGDA).

Minimum cure dose: is the minimal UV(-A) energy required to cure a 20 μm coating that withstands a minimum of 50 acetone double rubs (ADR) and passes the graphite test and fingernail mar test. The lower the dose to cure the coating, the better is the reactivity of the resin. The minimum cure dose corresponds to the cure speed for a given UV light source. The UV Energy dose is automatically derived from the measured UV irradiance (W/cm$^2$) with the UV Power Puck® II radiometer and the value for the UVA (320-390 nm) zone is recorded in the table.

TABLE 3

Examples and Comparative examples formulation

| | Ex F1 | Ex F2 | Ex F3 | Ex F4 | Ex F5 | Comp. Ex F1-R | Comp. Ex F2-R | Comp. Ex F3-R |
|---|---|---|---|---|---|---|---|---|
| Diacrylate ester of a bisphenol A epoxy resin | 13 | 13 | 13 | 13 | 13 | 13 | 13 | 13 |
| Tripropylene glycol diacrylate | 33 | 33 | 33 | 33 | 33 | 33 | 33 | 33 |
| Trimethylolpropane diacrylate | 33 | 33 | 33 | 33 | 33 | 33 | 33 | 33 |
| Amino acrylate of Ex 1 | 15 | | | | | | | |
| Amino acrylate of Ex 2 | | 15 | | | | | | |
| Amino acrylate of Ex 3 | | | 15 | | | | | |
| Amino acrylate of Ex 4 | | | | 15 | | | | |
| Amino acrylate of Ex 5 | | | | | 15 | | | |
| Comp Example 1 | | | | | | 15 | | |
| Comp Example 3 | | | | | | | 15 | |
| Comp Example 4 | | | | | | | | 15 |
| TPO-L | 3 | 3 | 3 | 3 | 3 | 3 | 3 | 3 |
| DETX | 3 | 3 | 3 | 3 | 3 | 3 | 3 | 3 |
| Cure speed (m/min) | 37.5 | 37.5 | 35 | 27.5 | 25 | 5 × 5 | 27.5 | 20 |
| Min. cure dose (mJ/cm$^2$) | 250 | 250 | 270 | 350 | 380 | 9315 | 350 | 480 |

APPLICATION EXAMPLES

1. Formulation for UV LED Curable Coatings

Radiation curable compositions were prepared based on the formulations described in Tables 3 and by adding 5 wt % of commercial IRGACURE® TPO-L photoinitiator from IGM (ethyl (2,4,6-trimethylbenzoyl) phenyl phosphinate).

Cured films (20 μm layers) on coated paper were prepared using a bar coater and curing was done under ambient atmosphere by UV LED with an air-cooled Phoseon Firejet, with a peak irradiance of 8 W/cm$^2$ at 365 nm wavelength (LED365). The distance of lamp to substrate is 1 cm.

The cure speed was determined to be the maximal belt speed under a given lamp—in this case LED365—giving a full cured film. Through cure of the film is investigated by acetone double rubs (ADR) with a wad drenched in acetone. A minimum of 50 ADR is required for a fully cured coating with optimum performance. The surface cure aspect of the film is assessed by the fingernail mar and graphite test. The graphite test is carried out by putting some graphite carbon black (Pencil No. 2) onto the coated surface and rubbing with a finger and then with a cotton swab. As long as a black trace is left on the coated surface, the film is not fully cured and passed again under the LED365. The fingernail mar test is carried out by marring the surface with the nail of the finger. If a mark is left behind on the surface, the surface cure is not complete and passed again under the LED365. A fully cured film is not visually affected by this test.

Above Table 3 clearly shows that higher reactivity is achieved with Examples F1 and F2, both based on a combination of DMAPA and DPA, compared to comparative examples F1-R and F2-R based on the same acrylate but where respectively no DPA and DMAPA are used. Example F 5, composed of a mixture of a di- and trifunctional acrylate monomer and where overall acrylate functionality is reduced to 2 by reaction with DPA shows a higher reactivity compared to Comp example F3-R where only a difunctional acrylate monomer DPGDA is used.

2. Formulation for UV Curable Cyan Flexo Ink

The pigment paste was prepared as follows: 51 wt % of the binder polyester acrylate (EBECRYL® 452 (commercial polyester acrylate from allnex) was mixed with 40 wt % of pigments and 9 wt % of additives (Table 4). In particular 51 g of the binder was blended at 25° C. with 1 g of Additol® S130 (in-can stabilizer from Allnex), 3.7 g of SOLSPERSE® 39000 (a 100% active polymeric dispersant from Lubrizol), 4.3 g of SOLSPERSE® 5000 premix (1.3 g SOLSPERSE® 5000 from Lubrizol grinded in 3.0 g commercial polyester acrylate from allnex) and 40 g of Pigment SPECTRA PAC-C Blue 15:4 (from Sun Chemical Corp.). The paste was grinded on triple roll mill until the right grinding gauge was obtained.

The ink was prepared from this pigment paste by diluting further with diluting monomers, example 3 of the current invention and photoinitiator to achieve the target viscosity. In particular cyan inks were prepared by blending at 25° C. 22 g of EBECRYL® 145 (two functional diluting acrylate from allnex), 27 g of PETIA (blend of 3 and 4 functional diluting acrylates from allnex), 6 g of a photoinitiator mix (composition: 50% IRGACURE® TPO-L from IGM, and 50% Speedcure® DETX (2,4-diethylthioxantone from Lambson), and 45 g of the pigment paste.

TABLE 4

Pigment paste and UV ink formulation

| | Comp. Ex F4-R | Comp. Ex F5-R | Ex F6 |
|---|---|---|---|
| Polyester acrylate (D1) | 51 | 51 | 51 |
| S39000 | 3.7 | 3.7 | 3.7 |
| S5000 (paste0.3%) | 4.3 | 4.3 | 4.3 |
| S130 | 1 | 1 | 1 |
| 15:4 PAC-C blue | 40 | 40 | 40 |
| Grinding of pigment paste triple roll - 2 pass | | | |
| Propoxylated Neopentylglycol Diacrylate (D2) | 22 | 12 | 12 |
| Pentaerythritol tri- and tetraacrylate mixture (D2') | 27 | 27 | 27 |
| Amino acrylate of Comp Ex1 | | 10 | |
| Amino acrylate of Ex 3 | — | | 10 |
| PI mix | 6 | 6 | 6 |
| PAC-C paste at 40% | 45 | 45 | 45 |

Rheology and reactivity of the obtained ink formulations were measured. A comparison was made between Formulation Example F6, a Comparative Formulation Example F4-R which is a flexo ink formulation based on a comparable formulation lacking an amino acrylate according to the invention, and a Comparative Formulation Example F5-R where the amino acrylate is the one from Comparative Example 1. Results are summarized in Table 5 below.

Application of the radiation curable compositions: The compositions above-described were applied onto C58 (BOPP film without adhesion primer) with a K303 Multicoater equipped with a flexo printing head and a 200 lines/inch @ 100% flexo plate (RK Print Coat Instruments Ltd., UK). This configuration allowed obtaining ca. 4 g/m² coatings with reproducibility better than 5%. The coatings were cured under ambient atmosphere by UV LED with LED365 (as described above) at the maximum line speed allowing obtaining a dry surface evaluated with the graphite test. Results are summarized in Table 5 below.

TABLE 5

Evaluation of the ink properties

| | Comp. Ex F4-R | Comp. Ex F5-R | Ex F6 |
|---|---|---|---|
| Rheology, cone plate, 25° C., Kp50 0.1 to 2500 s−1 | | | |
| 0.1 s−1 (*) | 803 | 634 | 877 |
| 2.5 s−1 | 572 | 538 | 746 |
| 2500 s−1 | 439 | 395 | 539 |
| SI 2.5-2500 s−1 | 1.83 | 1.60 | 1.63 |
| Reactivity on C58, LED365, printing proofer, 200 lines | | | |
| | 5 × 5 m/min | 5 × 5 m/min | 5 m/min |

(*) zero viscosity

This table shows that compositions according to the present invention permit to obtain inks with an improved reactivity compared to Comp. Ex F4-R where no amino acrylate is added, but also compared to formulations using amino acrylates from Comp Ex 1 (Comp. Ex F5-R). Moreover, the amino acrylates according to the invention do not significantly impact the ink formulation rheology, compared to inks without amino acrylates.

Rheology (viscosity, shortness index): is measured using a cone and plate type rheometer MCR100 (Paar-Physica) following ISO 3219. The measurement geometry for measuring the (flexo) inks of the inventions was of a diameter of 50 mm and an angle of 1° for the cone. The measurement was a flow curve in controlled shear rate ranging from D=0 s−1 (zero viscosity), D=2.5 s−1 to D=2500 s−1 at 25° C.

The invention claimed is:

1. A radiation curable addition product that contains (meth)acrylic groups and that is prepared from:
   (i) at least one (meth)acrylated compound (A) which comprises at least one (meth)acrylated compound (A-I) that contains 3 or more (meth)acrylic ester groups per molecule;
   (ii) at least one amino compound (C) that contains one secondary amino group and no primary amino group;
   (iii) at least one amino compound (B) which comprises at least one amino compound (B1) that contains one primary amino group and at least one tertiary amino group;
   and, optionally,
   (iv) the at least one (meth)acrylated compound (A) further comprises at least one (meth)acrylated compound (A-II) that contains 2 (meth)acrylic ester groups per molecule;
   (v) the at least one amino compound (B) further comprises at least one amino compound (B2) that is selected from (B2-1) amino compounds that contain one primary amino group and/or from (B2-2) amino compounds that contain two secondary amino groups, the at least one amino compound (B2) being different from the at least one amino compound (B1),
   wherein
   the nitrogen content of the radiation curable addition product is at least 1.2 meq/g;
   the average (meth)acrylate functionality per mole of the addition product is at most 2;
   the radiation curable addition product is nonionic; and
   the at least one amino compound (C) is represented by the following formula:

wherein R' is an alkyl, optionally substituted by hydroxy, alkoxy, tertiary amine and/or aryl, and R is an alkyl, optionally substituted by hydroxy, alkoxy, tertiary amine and/or aryl, with the proviso that R' and R are not linked together in order to form a ring.

2. The (meth)acrylated radiation curable addition product according to claim 1, wherein the (meth)acrylated radiation curable addition product is prepared from the at least one amino compound (B) that comprises relative to the total weight of the at least one amino compound (B): from 30 to 100 wt % of the at least one amino compound (B1), and from 0 to 70 wt % of one or more compounds (B2-1) and/or (B2-2).

3. The (meth)acrylated radiation curable addition product according to claim 1, wherein the (meth)acrylated radiation curable addition product is prepared from the at least one (meth)acrylated compound (A) that comprises relative to the total weight of the at least one (meth)acrylated compound (A): from 50 to 100 wt % of the at least one (meth)acrylated compound (A-I), and from 0 to 50 wt % of the at least one (meth)acrylated compound (A-II).

4. The (meth)acrylated radiation curable addition product according to claim 1, wherein the molar ratio of amino compounds (B1+B2) relative to (meth)acrylated compounds (A) is from 0.1 to 0.8.

5. The (meth)acrylated radiation curable addition product according to claim 1, wherein the at least one (meth)acrylated compound (A) is selected from the group consisting of (meth)acrylic esters (A1), polyether (meth)acrylates (A2), polyester (meth)acrylates (A3), epoxy (meth)acrylates (A4), (poly) urethane (meth)acrylates (A5), and mixtures thereof.

6. The (meth)acrylated radiation curable addition product according to claim 1, wherein the at least one amino compound (B1) is selected from selected from N,N-dialkyl-diaminoalkanes (B1-1).

7. The (meth)acrylated radiation curable addition product according to claim 1, wherein the at least one amino compound (B2) is selected from the group consisting of ethanolamine, isopropanolamine, 2-amino-2-methyl-1-propanol, and mixtures thereof.

8. The (meth)acrylated radiation curable addition product according to claim 1, wherein the at least one amino compound (C) is selected from the group consisting of diethylamine, di n-propylamine, di n-butylamine, di n-hexylamine, di 2-ethylhexylamine, di cyclohexylamine, di n-octylamine, di n-dodecylamine, di 2-(2-aminoethoxy) ethanol, di 5-aminopentanol, diethanolamine, di iso-propanolamine, and mixtures thereof.

9. The (meth)acrylated radiation curable addition product according to claim 1, wherein the at least one amino compound (B2) is not used as a reagent.

10. The (meth)acrylated radiation curable addition product according to claim 1, wherein the at least one (meth)acrylated compound (A-II) is not used as a reagent.

11. The (meth)acrylated radiation curable addition product according to claim 1, wherein the (meth)acrylated radiation curable addition product has a calculated number average molecular weight of between 400 and 3,500 Dalton.

12. The (meth)acrylated radiation curable addition product according to claim 1, wherein the (meth)acrylated radiation curable addition product has a viscosity at 25° C. of from 50 to 100,000 mPa·s.

13. A radiation curable composition comprising at least 5 wt % of one of more of the (meth)acrylated radiation curable addition products according to claim 1.

14. The radiation curable composition according to claim 13, further comprising at least 1 wt % of one or more (meth)acrylated compounds (D) that are different from the (meth)acrylated radiation curable addition products.

15. The radiation curable composition according to claim 13, which is an ink, a paint, a varnish, a coating composition or an adhesive.

16. A process for coating an article or substrate with a radiation curable composition according to claim 13 comprising the steps of:
(a) providing a radiation curable composition according to claim 13,
(b) applying said composition onto a surface, and
(c) irradiating the surface with actinic radiation.

17. The process according to claim 16, wherein the surface is irradiated with actinic radiation using an UV LED lamp emitting at 365, 385, 395 or 405 nm.

18. The (meth)acrylated radiation curable addition product according to claim 1, wherein the at least one amino compound (B1) is N,N-dimethyl-1,3-diaminopropane.

* * * * *